Patented May 11, 1937

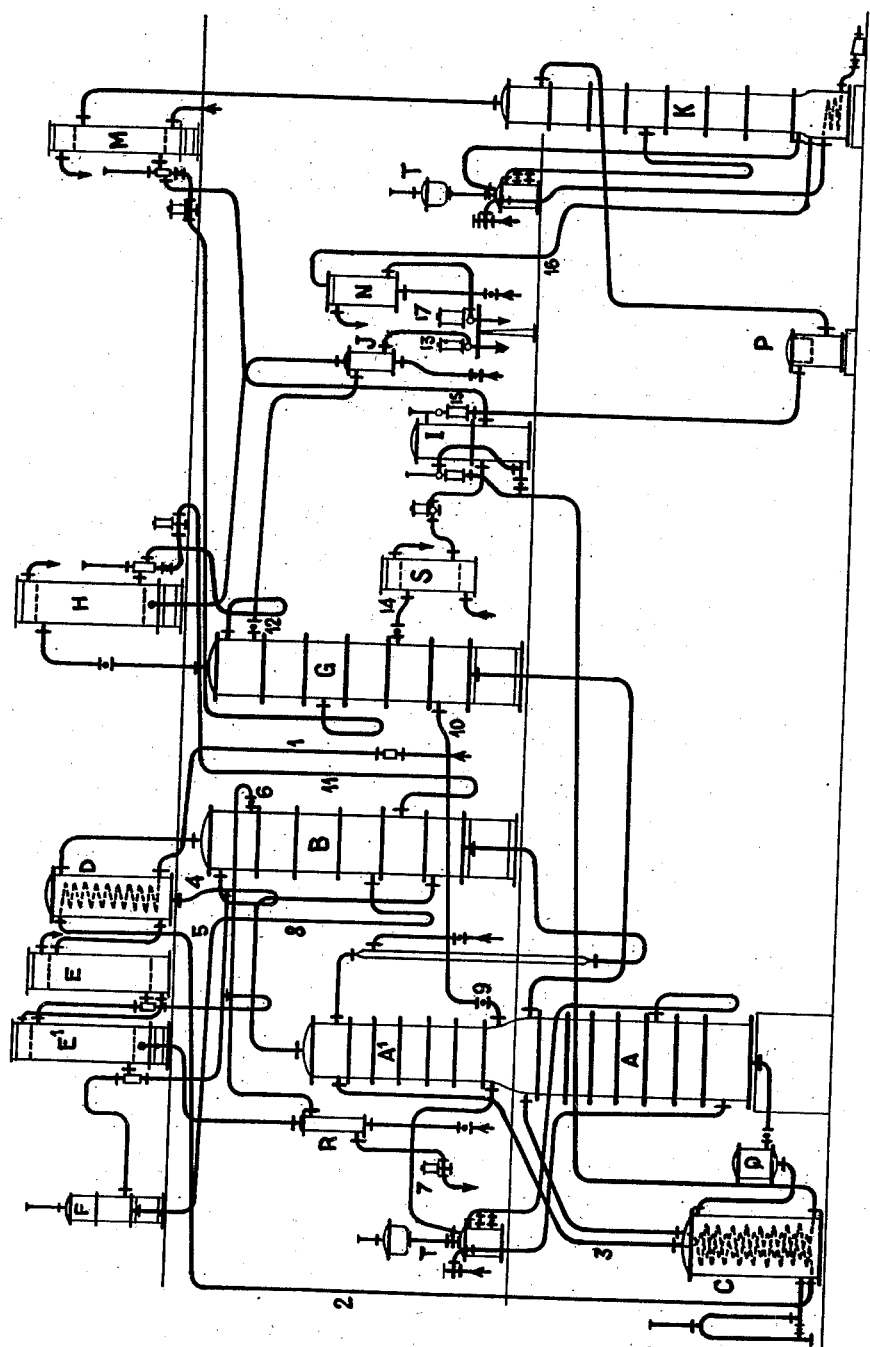

2,080,194

UNITED STATES PATENT OFFICE 2,080,194

APPARATUS AND PROCESS FOR THE CONTINUOUS DISTILLATION-RECTIFICATION OF MUSTS CONTAINING ACETONE, ETHYL ALCOHOL, AND BUTYL-ALCOHOL

Emile Augustin Barbet, Paris, France

Application November 28, 1933, Serial No. 700,158
In France December 1, 1932

3 Claims. (Cl. 202—39)

Under the influence of certain butyric ferments, amylaceous or sweet substances give rise to fermented musts which contain acetone, a small quantity of ethyl alcohol and finally a large proportion of butyl alcohol.

The apparatus which will be described hereinafter allows these three distinct substances to be extracted and rectified to purity, directly from the fermented must.

The accompanying drawing illustrates the said apparatus diagrammatically.

The complex must, taken up by a pump of suitable type (not shown in the drawing), is delivered through the pipe I into a coil arranged in the wine heater D. The must recuperates therein the heat of acetone vapours, but the latter can scarcely give it a temperature higher than 48 to 50° C. This must then flows down the pipe 2 in order to be heated to a much higher degree in the recuperator C, through which the vinasses of the must are evacuated, entirely freed from its three constituents. As these vinasses issue at about 104° C., the must acquires a temperature much higher than the boiling point of acetone (58° C.)

This must, in a suitable condition to be thoroughly freed from acetone, rises through the pipe 3, and supplies the column composed of two superposed parts A, A' of different capacities $A_1$ of which is provided with a sufficient number of plates to ensure that the acetone will be completely exhausted from the must.

The vapours which are liberated are rectified in the plate column B, by the refluxes of the wine heater D and of the cooling condensers E, $E_1$. The acetone is dehydrated, but it contains some aldehydes which must be separated.

For this purpose, the whole of the liquids condensed in D and E and $E_1$ returns to the top of B, through the pipes 4 and 5, in order to be pasteurized in B. A few plates lower down, acetone is extracted in a pure state through the cock 6, it is cooled in the cooler R and it can be drawn off from the test safe 7.

In order to avoid any loss of acetone, the remainder of the gases and vapours issuing from the bottom of $E_1$, passes to a small water scrubber F, and the water which has dissolved this small quantity of acetone returns through the pipe 8 to the plates at the lower part of the rectifying column B.

This constitutes the plant for the distillation and rectification of acetone.

The must which has been thoroughly freed from acetone, now flows down to the lower plates of A, which have the function of finally freeing the must from ethyl alcohol and butyl alcohol. The vapours which are evolved from the top of these plates A divide into two parts:

The first part, as stated above, rises in the plates of $A_1$ and of B for effecting the distillation and rectification of the acetone.

The second part is led, through the pipe 10, to the base of the column G which is adapted to rectify the ethyl alcohol and to separate it completely from the butyl alcohol, by the well known Barbet continuous rectification processes. That is to say, the cooling condenser H supplies the column G with the volume of reflux indispensable for causing the alcohol to reach 96/97 degrees. A small proportion of the distillate, called the nonpasteurized portion, containing some traces of acetone, returns, through the pipe II, to the lower plates of B, whilst all the remainder returns to the top of G.

A few plates lower down, pure pasteurized alcohol is extracted in the liquid state through the cock 12; this alcohol is cooled in J and issues through the test safe 13.

As butyl alcohol boils at a temperature much higher than that of ethyl alcohol, notwithstanding the azeotropic point it possesses in the presence of water, it is wholly delivered to the base of the column G. It is extracted through the pipe 14 and, owing to the fact that it is entirely freed from ethyl alcohol and that it is then but slightly soluble in water, it is led to a decanter I. The decanting is still more satisfactory if it has been previously cooled in the cooler S. The residual liquors from the column G return to the exhausting plates A.

Two layers are instantaneously formed in the decanter I. The upper layer issuing through the test safe 15 is a hydrated butyl alcohol containing about 83 to 80% of butyl alcohol and thus exceeding its azeotropic point, which is 63% of butyl alcohol for 37% of water. Then from the moment the azeotropic point is exceeded, this liquid will follow the general law of all azeotropic bodies. By means of a last plate column, a vapour is obtained which is at the azeotropic point (63%) and boils at 92.7° C.; that is to say at a point lower than the boiling point of the most volatile body, namely, the water.

Therefore, at the top of the column K, such a quantity of vapour is distilled that all water is evacuated therefrom to cooler M. No reflux is necessary in the column K. All the condensed liquid returns to the column G, at a stage corresponding approximately to 63% of butyl alcohol.

At the same time, if some traces of ethyl alcohol remain, this impurity is definitely eliminated and sent back to G.

On the other hand, butyl alcohol becomes more and more dehydrated by flowing down the plates K, and it is completely anhydrous when it enters the base of the column, from which it is drawn off in the form of vapours through the pipe 16, in order to be condensed and cooled in N and to flow into the test safe 17.

In case the hydrated alcohol feeding this column should contain a small quantity of butyric acid, this alcohol should be caused to pass, before being admitted into the column K, into the vessel P containing either chalk, or an alkali, for forming a fixed butyrate. The alcohol drawn off from the test safe 17 would therefore be not only anhydrous, but completely pure. The water from the decanter I containing traces of butyl alcohol is returned to the column A by the pipe 18 being preheated in recuperator C.

It is to be understood that the operation of the columns is rendered constant by steam regulators T and T'.

What I claim as my invention and desire to secure by Letters Patent is:—

1. An apparatus for a direct distillation and rectification of musts containing acetone, ethyl alcohol and butyl alcohol, comprising a distilling column adapted to be fed with pre-heated must, a first rectifying column for acetone, a conduit between the top of said distilling column and said first rectifying column, a reflux condenser, a plurality of cooling condensers and a water scrubber for said first rectifying column, means for returning aqueous acetone from said water scrubber to the first rectifying column, means for returning residual liquor from the bottom of the first rectifying column to said distilling column, a second rectifying column for ethyl alcohol and butyl alcohol, a conduit from the middle of said distilling column to said second rectifying column, a reflux condenser for said second rectifying column and a conduit from said reflux condenser for the second rectifying column to the first rectifying column for returning condensate containing traces of acetone, an outlet near the top of the second rectifying column communicating with the cooler for ethyl alcohol, an outlet at the bottom of said second rectifying column and means for returning residual liquors to the distilling column, a butyl alcohol cooler, an outlet pipe from the middle of said second rectifying column for butyl alcohol-water azeotropic mixture communicating with said cooler, a decanter for said azeotropic mixture wherein same is separated into a water layer and a butyl alcohol layer, means on said decanter for returning the water layer to the first distilling column, and means for conducting the butyl alcohol layer from the decanter, a third rectifying column, an outlet for extracting at the bottom of this third rectifying column anhydrous butyl alcohol vapors and a cooling condenser for said vapors, an auxiliary condenser, an outlet pipe at the top of said third rectifying column for aqueous butyl alcohol vapors leading to said auxiliary condenser, an outlet from said auxiliary condenser for return of a portion of the condensate to the decanter and of the other portion of the condensate to the second rectifying column.

2. In the apparatus as claimed in claim 1, the interposition between the decanter and the distilling column for the butyl alcohol, of a vessel containing either chalk or an alkali for the elimination of butyric acid from the butyl alcohol.

3. A method for continuous distillation and rectification of musts containing acetone, ethyl alcohol and butyl alcohol obtained directly from these musts, comprising preheating said musts, distilling the musts in a distilling column of two superposed zones of different working capacities, the musts being subjected to moderate boiling in the upper zone so as to distill only the lighter parts and particularly the whole of the acetone, while removing in the lower zone the ethyl alcohol and butyl alcohol from the must, the impure acetone from the head of the column being rectified in a first rectifying column, and extracted in a state of purity from this column, the ethyl alcohol mixed with the butyl alcohol from the lower zone of the initial distilling column passing in a state of vapours into a second rectifying column wherein is effected the separation of the ethyl alcohol and the butyl alcohol, the ethyl alcohol being extracted in a very highly rectified state at the top of the said second rectifying column, while an azeotropic mixture of butyl alcohol and water containing neither acetone nor ethyl alcohol is extracted towards the centre of the said second rectifying column and after cooling is introduced into a decanter in which the butyl alcohol and water are separated into two layers, the butyl alcohol layer, which is then richer in alcohol than said azeotropic mixture, passing into a last rectifying column wherein butyl alcohol is extracted at the base of this column in the state of anhydrous vapours and passing finally into a cooling condenser while a mixture of water and butyl alcohol is extracted in a vapour state at the top of this column; this water and butyl alcohol mixture after condensation, being supplied partly to the decanter and partly to the rectifying column preceding the decanter.

EMILE AUGUSTIN BARBET.